Patented Oct. 15, 1946

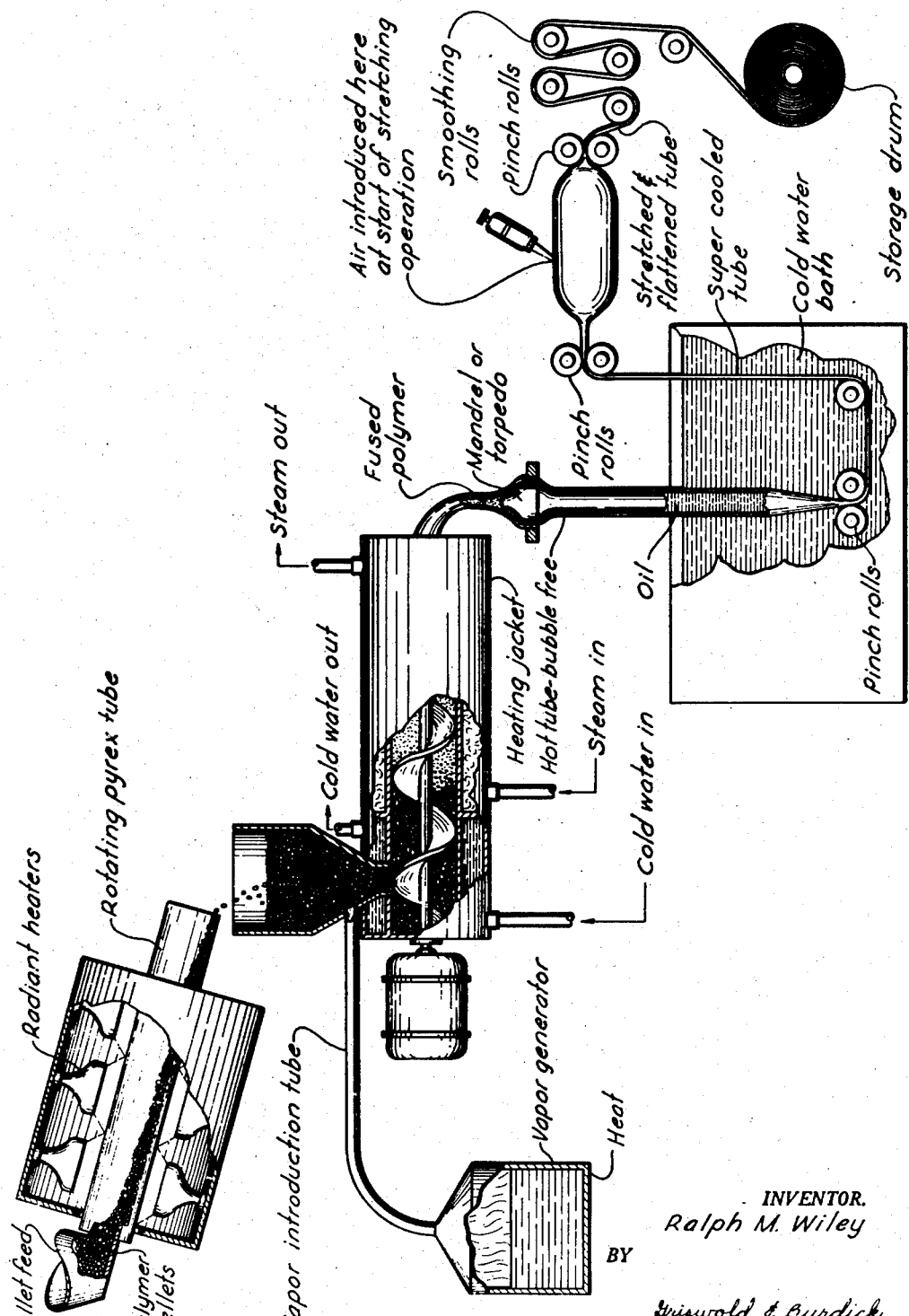

2,409,521

UNITED STATES PATENT OFFICE 2,409,521

VINYLIDENE CHLORIDE POLYMER EXTRUSION

Ralph M. Wiley, Midland, Mich., assignor to The Dow Chemical Company, Midland, Mich., a corporation of Michigan Application November 22, 1943, Serial No. 511,343

3 Claims. (Cl. 18—55)

This invention relates to the extrusion molding of vinylidene chloride polymers and is more particularly concerned with a method of eliminating the formation of bubbles in articles extruded from such polymers.

By the term "vinylidene chloride polymers," as herein used, is meant the polymer of vinylidene chloride alone and copolymers thereof with other polymerizable substances, such as vinyl chloride, vinyl acetate, styrene, acrylonitrile, the esters of carboxylic or inorganic acids, unsaturated ethers, et cetera. The term also includes compositions containing such polymers modified by the addition of plasticizers, fillers, light and heat stabilizers, coloring agents, and the like, which retain substantially the working characteristics of the polymers.

The extrusion of such polymers ordinarily involves feeding preheated powder or pellets of the polymer into a hopper at a fairly uniform rate so as to maintain the level of the material in the hopper substantially constant. The hopper is usually mounted directly over one end of a cylinder provided with a screw which conveys the polymer along the externally heated chamber, thereby to compress and melt the polymer, and force it through a shape-imparting die. In the extrusion of such polymers, considerable difficulty is frequently encountered due to the formation of minute bubbles in the extruded sections. The bubbles seem to result from the inclusion of air in the polymer. The air may be adsorbed on the polymer powder or pellets or may pass into the extrusion cylinder with the feed from the hopper and become entrapped between the particles before they melt. Bubble formation is particularly apparent in extrusion operations carried out at low pressures. While a certain number of bubbles may be tolerated in relatively thick sections, although detracting from their physical properties, in the extrusion of sections such as thin-walled tubing, fine filaments, et cetera, bubbles render such articles useless for many purposes and interfere with cold-working operations.

It is accordingly a principal object of the present invention to provide a method whereby bubble-free extruded articles can be produced from vinylidene chloride polymers. A further object of the invention is to provide a method whereby vinylidene chloride polymers in pellet form can be used in extruding articles of thin sections.

I have now found that the foregoing and related objects can be accomplished by introducing the vapor of a suitable substance into the polymer feed to the extrusion cylinder or zone. The vapor of the substance employed is preferably introduced at the bottom of the hopper from which the polymer feeds to the extruder screw. The substance must have a vapor density greater than air and should be chemically inert to the polymer composition under extrusion conditions. The vapor of the substance must be capable of permeating said polymer or diffusing therethrough at extrusion temperatures. The amount of the substance in the extruded polymer must be such that its partial pressure in the polymer at extrusion temperature does not exceed atmospheric.

Among the substances which I have found suitable for use according to the invention are the chlorinated lower aliphatic hydrocarbon compounds, such as methylene chloride, chloroform, carbon tetrachloride, ethyl chloride, monomeric vinyl chloride, monomeric vinylidene chloride, butyl chloride, and monochloroheptane. I prefer to use the chlorinated lower aliphatic hydrocarbons in view of the fact that they are less hazardous to handle, being substantially non-flammable, readily adapted to be vaporized and fed to the extrusion zone with the polymer powder or pellets, and they have high vapor densities, enabling them to displace the air in the hopper.

The improvement characterizing the present invention can best be illustrated with reference to a process for making film by the simultaneous radial and longitudinal expansion of an extruded thin-walled tube. Such a process is schematically presented in the annexed drawing, forming a part of this specification. In such process, the film may be prepared by feeding pellets ⅛-inch in diameter by 1/16-inch in length of a vinylidene chloride polymer through a radiant heated transparent rotating tube into a hopper mounted directly over a 2-inch standard extruder. The polymer level is maintained substantially constant in said hopper to provide a bed of material say eight inches in depth. A tube is provided about one inch from the bottom of the hopper through which vapor can be introduced in accordance with the present invention.

The polymer may be prepared by polymerizing a mixture containing about 85 per cent vinylidene chloride and 15 per cent of vinyl chloride and compounding with 7 per cent by weight of diphenyl-diethyl ether as a plasticizer. The polymer is extruded at a temperature of 170° to 173° centigrade through a circular die orifice having an outside diameter of 2.50 inches and an internal diameter of 2.38 inches. The thin-walled tube, while still hot, is conducted into a bath of water maintained at from 2° to 7° centigrade in order to supercool the copolymer. A quantity of high boiling petroleum oil, having a specific gravity of about 0.870 at 20° centigrade, is maintained inside the tube so that its surface is from ½ to 1 inch above that of the cold water bath. The copolymer is extruded at a rate of 75 pounds per hour.

The supercooled tube is passed between a first pair of pinch rolls rotating at a peripheral speed of from 9 to 10 feet per minute and subsequently between a second pair of pinch rolls rotating at a peripheral speed of from 23 to 26 feet per minute. Compressed air is introduced, by means of a hollow needle, into the section of the tube lying between the first and second set of pinch rolls until a portion of the section is distended with the formation of a bubble of diameter larger than the diameter of the super-cooled tube and the introduction of further air results only in the elongation of the distended bubble and not in any further substantial increase in its diameter. The pressure of the air within the tube is between 1 and 1.5 pounds per square inch.

The stretched and flattened tube which issues from between the second pair of pinch rolls is passed under considerable tension over a series of smoothing rolls and eventually winds on a drum for storage. The supercooled tube, after passing through the first set of pinch rolls, has a diameter of 2.37 inches and a wall thickness of about 0.025 inch. After cold-stretching, the tube has a diameter of about 12 inches and a wall thickness of between 0.002 and 0.025 inch. A section of the cold-stretched tube is slit longitudinally, unfolded, and smoothed to form a film having a width of over 37 inches.

In the practice of the aforesaid process under the conditions above-outlined, without the use of the present invention, it is difficult to run more than a few minutes, say 2 to 15 minutes, without rupture of the tube and loss of the gas trapped between the pinch rolls, due to bubbles in the extruded thin-walled tube. By utilizing the present invention, supplying 2.7 per cent of vinylidene chloride monomer vapor based on the weight of the polymer, it has been possible to run continuously for several hours without loss of the said entrapped gas. Also, the said film process can be operated at considerably increased rates of production through the use of the present invention than is otherwise possible.

I have also practiced the aforesaid process for the production of film with entirely satisfactory results using the following agents in the proportions given: 4 per cent of monomeric vinyl chloride in the feed to the extruder, 2.4 per cent of ethyl chloride, 1.8 per cent of methylene chloride, 3.6 per cent of chloroform, 2.35 per cent of carbon tetrachloride, all percentages being by weight based on the weight of the polymer. The above percentages are those fed in the hopper, and do not represent the proportion of vapor in the extruded product, the latter, being, in general, a very small percentage.

I claim:

1. In the extrusion of a vinylidene chloride polymer, the step of introducing into and mixing with the polymer feed to the extrusion zone at atmospheric pressure, the vapor of a chlorinated lower aliphatic hydrocarbon which is volatile at temperatures in the extrusion zone, in small amounts such that the partial pressure of the chlorinated hydrocarbon in the extruded polymer is below atmospheric pressure at extrusion temperature.

2. The method as claimed in claim 1, wherein the chlorinated lower aliphatic hydrocarbon is monomeric vinylidene chloride.

3. The method as claimed in claim 1, wherein the chlorinated lower aliphatic hydrocarbon is carbon tetrachloride.

RALPH M. WILEY.